US011025355B2

United States Patent
Zeng (10) Patent No.: US 11,025,355 B2
(45) Date of Patent: Jun. 1, 2021

(54) INTERACTIVE DEVICE FOR INTERNET RADIO STATION

(71) Applicant: Shenzhen Airsmart Technology Co., Ltd, Guangdong (CN)

(72) Inventor: Dejun Zeng, Guangdong (CN)

(73) Assignee: Shenzhen Airsmart Technology Co., Ltd, Shenzhen (CN)

( * ) Notice: Subject to any disclaimer, the term of this patent is extended or adjusted under 35 U.S.C. 154(b) by 0 days.

(21) Appl. No.: 17/043,751

(22) Filed: Sep. 30, 2020

(65) Prior Publication Data

US 2021/0036794 A1 Feb. 4, 2021

(51) Int. Cl.
*H04H 60/88* (2008.01)
*H04B 1/16* (2006.01)
*H04B 1/18* (2006.01)
*H04H 40/18* (2008.01)

(52) U.S. Cl.
CPC .......... *H04H 60/88* (2013.01); *H04B 1/1607* (2013.01); *H04B 1/18* (2013.01); *H04H 40/18* (2013.01)

(58) Field of Classification Search
CPC ........ H04H 20/95; H04H 20/22; H04H 20/82; H04H 2201/40; H04H 40/00; H04H 40/27; H04H 60/37; H04H 60/43; H04H 60/44; H04H 60/46; H04H 60/47; H04H 60/58; H04H 60/65; H04H 60/72; H04B 1/0057; H04B 1/0475; H04B 1/1036; H04B 1/385; H04B 2001/1063
USPC ...................................................... 455/3.04
See application file for complete search history.

(56) References Cited

U.S. PATENT DOCUMENTS

2002/0073171 A1* 6/2002 McDowall .............. H04L 67/26
 709/217
2013/0217351 A1* 8/2013 Jarvinen ................ H04B 1/082
 455/230

FOREIGN PATENT DOCUMENTS

CN 106330369 A 1/2017

OTHER PUBLICATIONS

International Search Report of PCT Patent Application No. PCT/CN2018/087428 dated Feb. 13, 2019.

* cited by examiner

*Primary Examiner* — Ajibola A Akinyemi (57) ABSTRACT

Disclosed is an interactive device for an internet radio station including a content presentation unit and a content selection unit. The content selection unit includes an operation module, a processing module, an indication module and a communication module. The operation module is used by a user to input a channel selection command by means of manual rotation and to generate a corresponding electrical signal. The processing module is used for acquiring corresponding audio resources from the network radio according to the electrical signal and issuing the corresponding audio resources to the content presentation unit which is used for playing back the audio resource. The processing module is further used for driving the indication module to generate a state change corresponding to the electrical signal. Hence, the user may select audio resources by rotating the operation module, so that the channel selection is similar to a traditional rotary tuning method.

2 Claims, 5 Drawing Sheets

INTERACTIVE DEVICE FOR INTERNET RADIO STATION

TECHNICAL FIELD

The present disclosure relates generally to an electronic communication technical field, and more particularly relates to an interactive device for an internet radio station.

BACKGROUND

It has been more than 100 years since the birth of the traditional radio which has brought great impact on human life, especially in the era when television and internet have not appeared, it is the best tool for people to obtain information and enjoy entertainment programs. However, due to the limited transmission distance and poor sound quality (except FM), the traditional radio is gradually marginalized due to the influence of the region and listening environment in additional to the less and less content. With the rapid development of various electronic technologies and the internet, we have entered the network era. At present, there are many network radio stations on the network. These network radio stations can provide real-time music or broadcast voice programs, or provide the recording and playback of the music and broadcast, which brings great convenience to people. These radio stations are generally listened through the network radio or computer with screen or key indication from the internet. However, as these usage interaction manners are not as convenient as that of the traditional radio, so many users report that the use experience is not good. In addition, the traditional computer is relatively large, and subject to the network circuit, people usually can only listen at home, or use a laptop to listen, but it is still more troublesome. Moreover, because the computers and mobile phones are not radios themselves, there are little radio core components such as high-quality audio processing components, power amplifiers, which can provide good user experience and high-quality audio effect.

We think that both traditional radio and internet radio are tools for people to connect with sound content. Because the internet radio has more content and wider crowd adaptability, the network radio has gradually become an ideal entertainment tool for young people to accompany their voice and emotion.

SUMMARY

The present disclosure has provided an interactive device for an interne radio station whose channel can be changed by simply rotating the knob, similar to the traditional radio, aiming at the technical problem of the complicated listening mode of the current internet radio station, so that the user who is used to the traditional radio tuning manner will not have adaption difficulty when using the interactive device for an interne radio station provided by the present application and can accept and freely use the interactive device for an internet radio station of the present application to select the audio resources.

According to an aspect, an interactive device for an internet radio station is provided, which comprising a content presentation unit and a content selection unit, wherein the content selection unit comprises an operation module, a processing module electrically connected with the operation module, an indication module of a physical shape electrically connected with the processing module, and a communication module electrically connected with the processing module; wherein the operation module is configured to input, by a user, a channel selection instruction by means of manual rotation and generate a corresponding electrical signal; wherein the processing module is linked to a network radio station by the communication module, and configured to obtain, according to the electrical signal, a corresponding audio resource from the network radio station and release the corresponding audio resource to the content presentation unit; the content presentation unit is configured to play the audio resource; wherein the processing unit is further configured to drive the indication module to generate a state change corresponding to the electrical signal.

Advantageously, the operation module comprises a rotary encoder and a knob sheathed on a rotary shaft of the rotary encoder; wherein the rotary encoder is arranged inside with a channel selection circuit which is configured to generate the electrical signal corresponding to the channel selection instruction.

Advantageously, the indication module comprises a dial provided with N identifiers and a light board provided with an indication circuit electrically connected with the processing module, wherein the indication circuit comprises N light-emitting elements which are corresponding with the N identifiers one by one, wherein N refers to a natural number greater than zero.

Advantageously, the processing module is further configured to drive the light-emitting elements of the indication module to be switched on according to the electrical signal.

Advantageously, the processing module and the communication module are integrated on an electronic circuit board, the rotary encoder and the light board are welded on the electronic circuit board; wherein the light board is provided with a first circular hole at its center for passing through the rotary shaft of the rotary encoder, the dial is provided with a second circular hole at its center for passing through the rotary shaft of the rotary encoder; wherein the rotary shaft of the rotary encoder passes through the first circular hole and the second circular hole.

Advantageously, the N light-emitting elements are arranged around the first circular hole at regular intervals, and the N identifiers are arranged around the second circular hole at regular intervals.

Advantageously, the interactive device for an internet radio station further comprises a shell and a lens, wherein the dial is clamped on the shell and the lens is clamped on the dial, Wherein the lens is provided with a third circular hole at its center for passing through the rotary shaft of the rotary encoder, and the rotary shaft of the rotary encoder passes through the third circular hole.

Advantageously, the operation module comprises a rotary encoder and a knob physically connected with a rotary shaft of the rotary encoder through a contact module; wherein the rotary encoder is arranged inside with a channel selection circuit which is configured to generate the electrical signal corresponding to the channel selection instruction; when the knob is rotated by the user to input the channel selection instruction, the knob is configured to bring the rotary shaft of the rotary encoder to rotate through the contact module, such that the rotary encoder is configured to generate the electrical signal corresponding to the channel selection instruction.

Advantageously, the indication module comprises a pull wire, a pointer connected with the pull wire, a dial arranged along the pull wire and a light board corresponding to the dial; wherein the dial is provided with N identifiers which are corresponding with a plurality of different audio resources one by one, the light board is provided with an indication circuit electrically connected with the processing module, wherein the indication circuit comprises N light-emitting elements which are corresponding with the N identifiers one by one, wherein N refers to a natural number greater than zero;

wherein the contact module comprises a first pull wire wheel, wherein the first pull wire wheel and the knob are winded by the pull wire, respectively;

wherein when the knob is rotated by the user to input the channel selection instruction, the knob is configured to drive the pull wire to walk a certain track, so that the first pull wire wheel is configured to bring the rotary shaft of the rotary encoder to rotate correspondingly for generating the electrical signal corresponding to the channel selection instruction; wherein the processing module is configured to obtain, according to the electrical signal, a corresponding audio resource from the network radio station and release the corresponding audio resource to the content presentation unit; the content presentation unit is configured to play the audio resource; the processing module is further configured to drive the light-emitting elements to be switched on according to the electrical signal, and the pointer is configured to move along the dial with the pull wire and align with the light-emitting elements which is switched on.

Advantageously, the indication module comprises a pull wire, a pointer connected with the pull wire, a dial arranged along the pull wire and a light board corresponding to the dial; wherein the dial is provided with N identifiers which are corresponding with a plurality of different audio resources one by one, the light board is provided with an indication circuit electrically connected with the processing module, wherein the indication circuit comprises N light-emitting elements which are corresponding with the N identifiers one by one, wherein N refers to a natural number greater than zero;

wherein the contact module comprises a second pull wire wheel connecting with the rotary shaft of the rotary encoder, a first passive transmission wheel and a second passive transmission wheel; wherein the second pull wire wheel, the first passive transmission wheel, the second passive transmission wheel and the knob are winded by the pull wire simultaneously;

wherein when the knob is rotated by the user to input the channel selection instruction, the knob is configured to drive the pull wire to walk a certain track, so that the second pull wire wheel is configured to bring the rotary shaft of the rotary encoder to rotate correspondingly for generating the electrical signal corresponding to the channel selection instruction; wherein the processing module is configured to obtain, according to the electrical signal, a corresponding audio resource from the network radio station and release the corresponding audio resource to the content presentation unit; the content presentation unit is configured to play the audio resource; the processing module is further configured to drive the light-emitting elements to be switched on according to the electrical signal, and the pointer is configured to move along the dial with the pull wire and align with the light-emitting elements which is switched on.

The implementation of the interactive device for an internet radio station provided by the present application can achieve the following beneficial effects. The interactive device for an internet radio station comprises a content presentation unit and a content selection unit, wherein the content selection unit comprises an operation module, a processing module electrically connected with the operation module, an indication module of a physical shape electrically connected with the processing module, and a communication module electrically connected with the processing module; wherein the operation module is configured to input, by a user, a channel selection instruction by means of manual rotation and generate a corresponding electrical signal; wherein the processing module is linked to a network radio station by the communication module, and configured to obtain, according to the electrical signal, a corresponding audio resource from the network radio station and release the corresponding audio resource to the content presentation unit; the content presentation unit is configured to play the audio resource; wherein the processing unit is further configured to drive the indication module to generate a state change corresponding to the electrical signal. In such a way, the user can select audio resources by rotating the knob. This operation manner is similar to the rotary tuning manner of the traditional radio, so that the user who is used to the traditional radio tuning manner will not have adaption difficulty when using the interactive device for an internet radio station provided by the present application and can accept and freely use the interactive device for an internet radio station of the present application to select the audio resources.

DETAILED DESCRIPTION OF THE PREFERRED EMBODIMENT

To make the object, the technical solution, and the advantage of the present application more clearly, the present application is further described in detail below with reference to the accompanying embodiments. It should be understood that the specific embodiments described herein are just a part of rather than all the embodiments of the present application. All other embodiments obtained by one skilled in the art without inventive works based on the embodiment of the present application, fall into the protection scope of the present application.

Embodiment 1

The interactive device for an internet radio station provided by the present embodiment comprises a shell, a content presentation unit and a content selection unit.

The content presentation unit may be one or more loudspeakers mounted on the shell and exposed to the outside.

Figure 1:
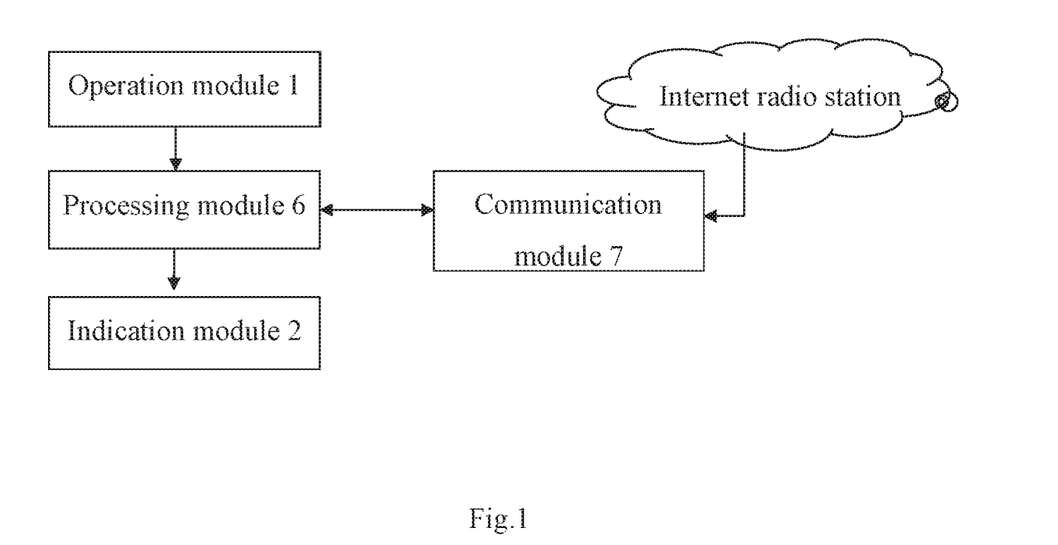
FIG. 1 is a block schematic diagram of the content selection unit according to the first embodiment of the present application.

As shown in FIG. 1, the content selection unit comprises an operation module 1, a processing module 6 electrically connected with the operation module 1, an indication module 2 of a physical shape electrically connected with the processing module 6, and a communication module 7 electrically connected with the processing module 6. The processing module 6 is connected to the network radio station through the communication module 7.

Figure 2:
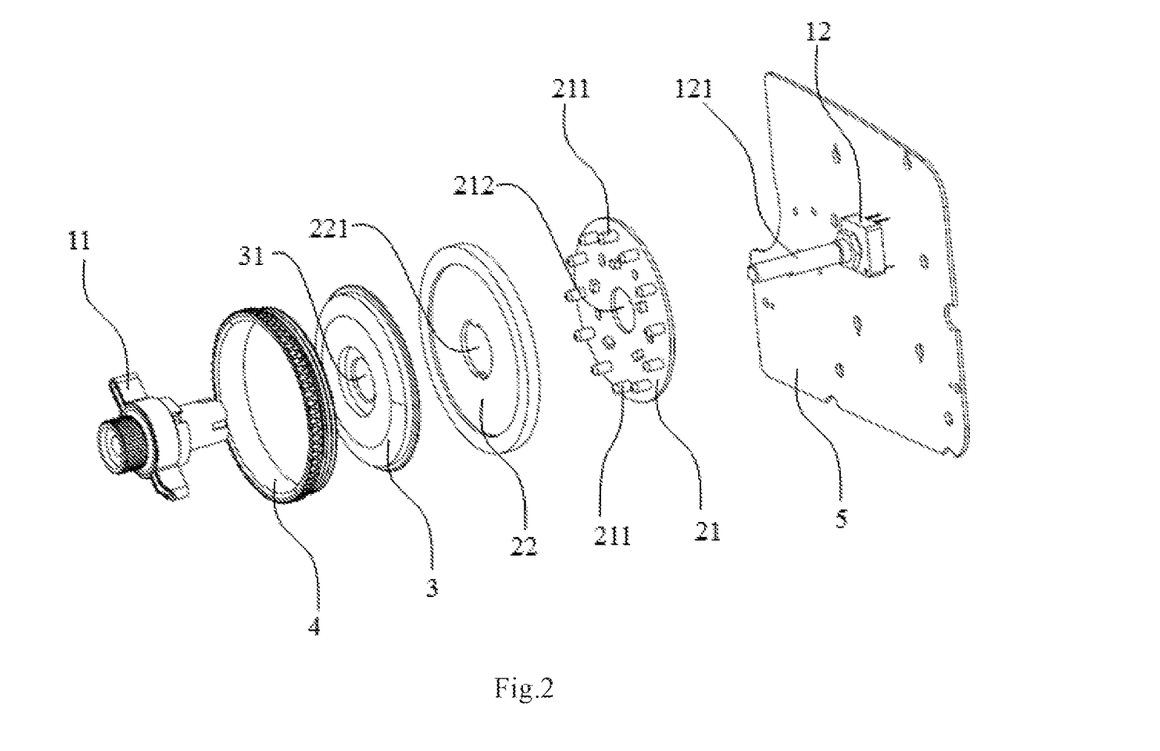
FIG. 2 is a stereoscopic decomposition diagram of the content selection unit according to the first embodiment of the present application.
Figure 4:
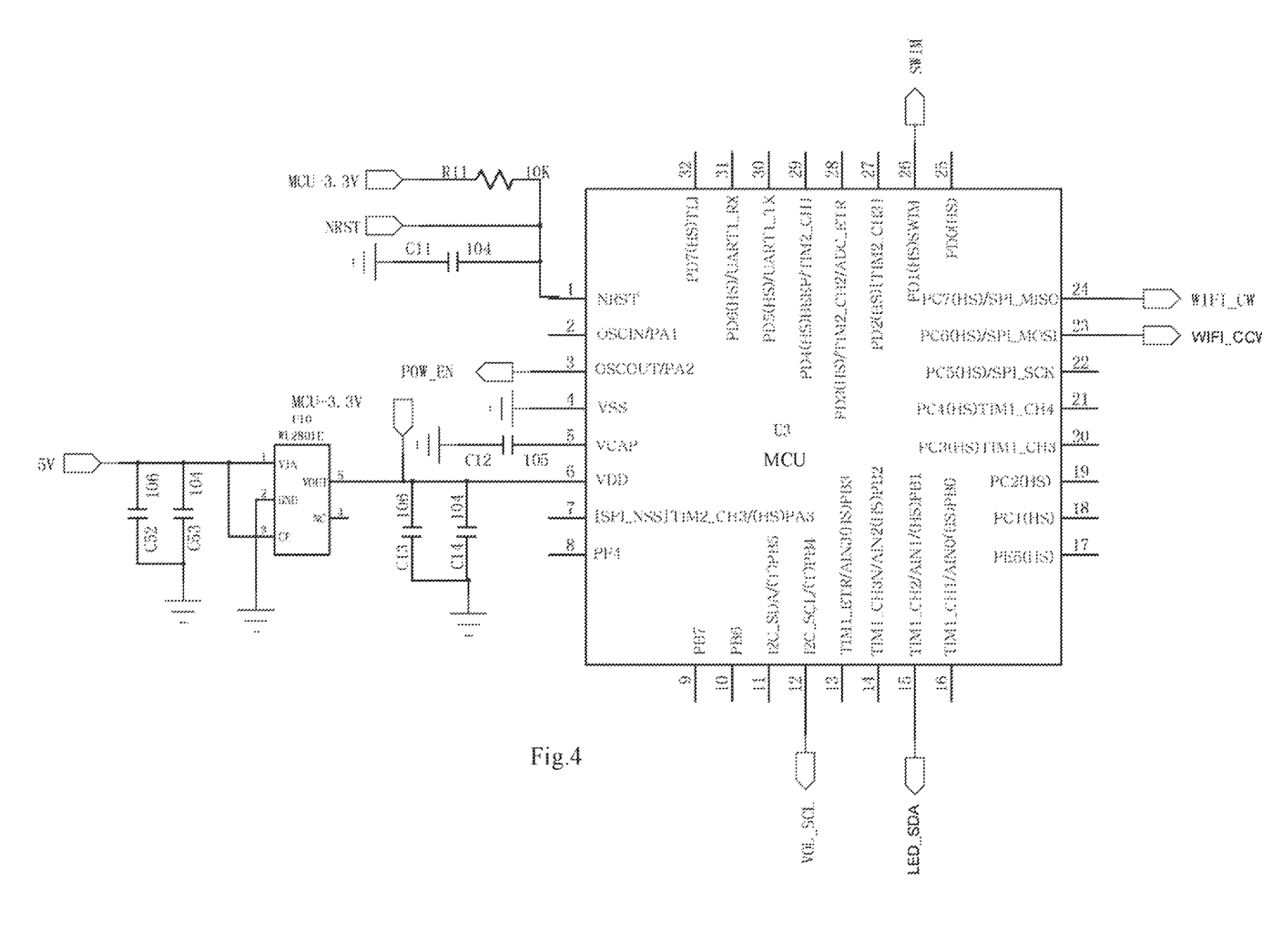
FIG. 4 is a circuit structure diagram of the processing module according to the first embodiment of the present application.

As shown in FIG. 2, an electronic circuit board 5 is fixed inside the shell. The processing module 6, the channel selection module and the communication module 7 are integrated on the electronic circuit board 5. The circuit structure of the processing module 6 is shown in FIG. 4. The communication module 7 adopts the Wi-Fi chips.

Figure 3:
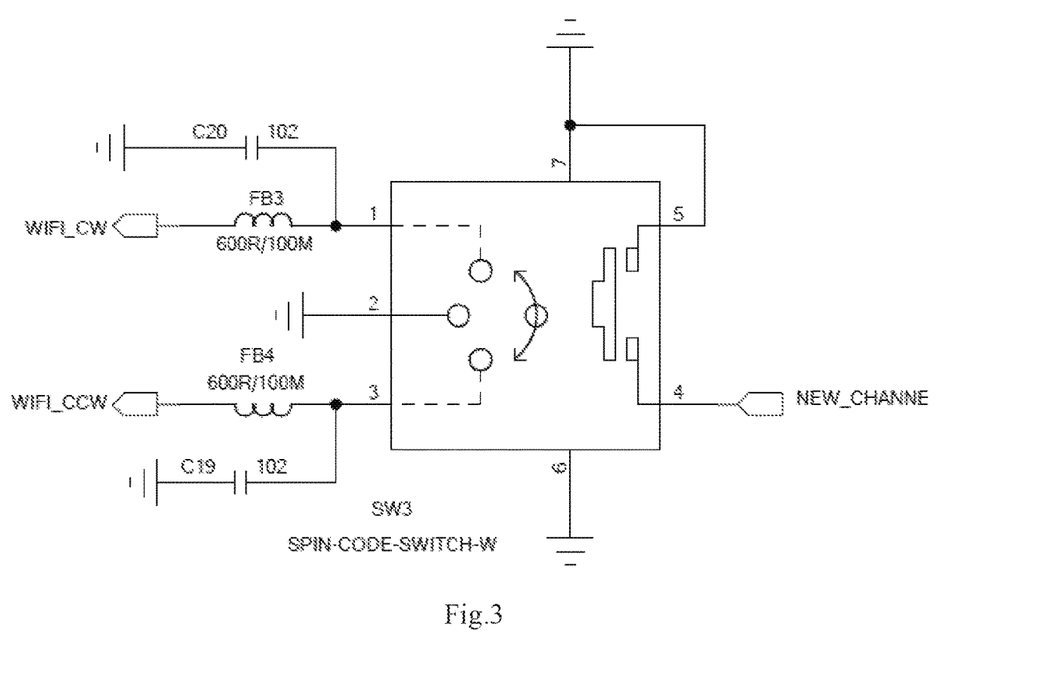
FIG. 3 is a circuit structure diagram of the channel selection circuit according to the first embodiment of the present application.

As shown in FIG. 2, the operation module 1 comprises a rotary encoder 12 and a knob 11 sheathed on a rotary shaft 121 of the rotary encode 12. The rotary encoder 12 is welded on the electronic circuit board 5. The rotary encoder 12 is arranged inside with a channel selection circuit which is configured to convert the angular displacement of the rotary shaft 211 into the corresponding electrical signal. In this embodiment, FIG. 3 is a circuit structure diagram of the channel selection circuit.

Figure 5:
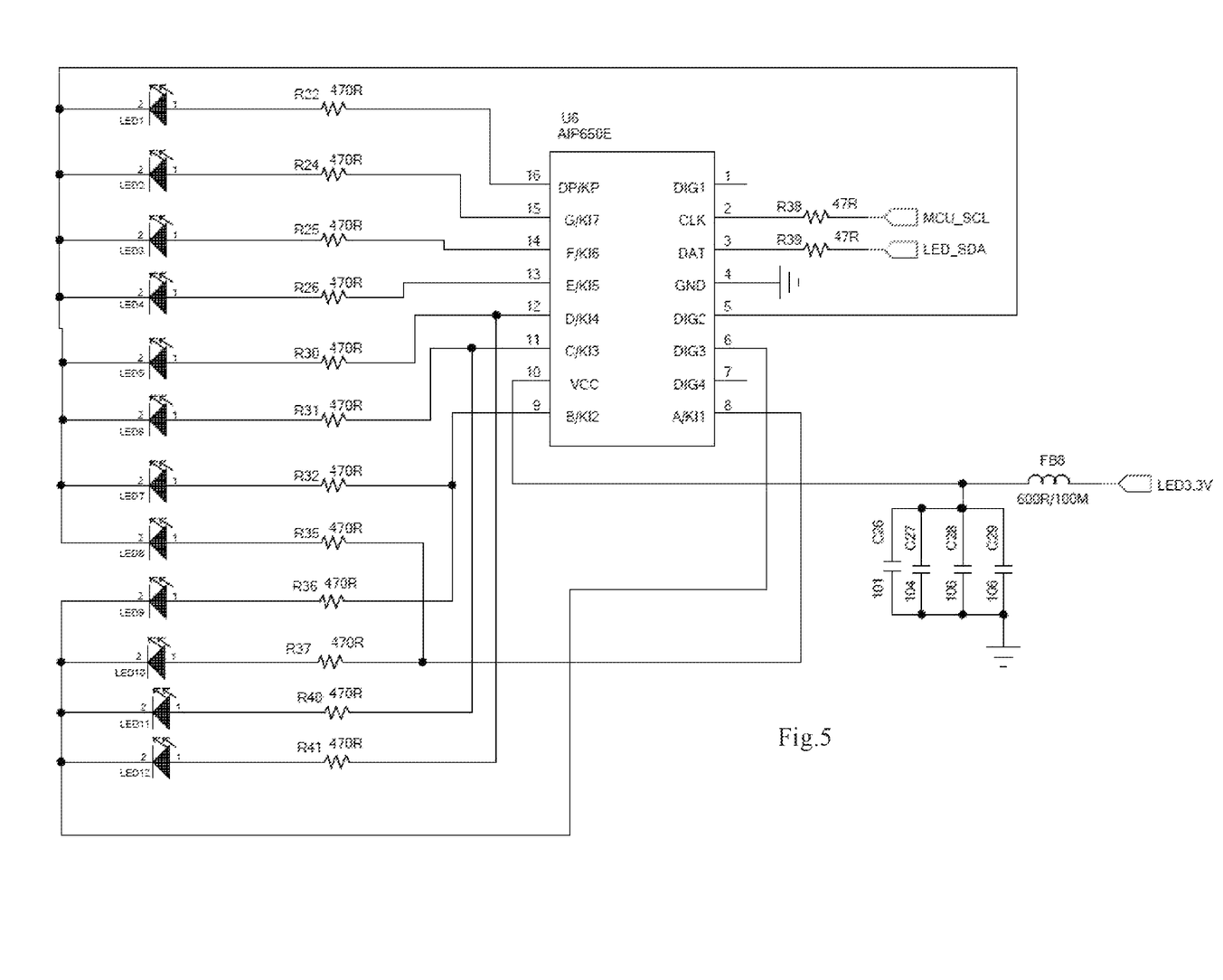
FIG. 5 is a circuit structure diagram of the indication circuit according to the first embodiment of the present application.

As shown in FIG. 2, the indication module 2 comprises a dial 22 provided with 1~N identifiers (N refers to a natural number greater than zero) and a light board 21 provided with an indication circuit electrically connected with the processing module 6. FIG. 5 is a circuit structure diagram of the indication circuit. The indication circuit comprises 1~N light-emitting elements which are corresponding with the 1~N identifiers one by one. The light board 21 is welded on the electronic circuit board 5. The light board 21 is provided with a first circular hole 212 at its center for passing through the rotary shaft 121 of the rotary encoder 12. The dial 22 is provided with a second circular hole 221 at its center for passing through the rotary shaft 121 of the rotary encoder 12. The rotary shaft 121 of the rotary encoder 12 passes through the first circular hole 212 and the second circular hole 221. The identifiers are numbers 1~N, wherein N refers to a natural number greater than zero. The 1~N identifiers are arranged around the second circular hole 221 at regular intervals. The 1~N LEDs are arranged on the surface of the light board 21 facing the dial 22, and meanwhile, the 1~N LEDs are arranged around the first circular hole 212 at regular intervals. The 1~N LEDs are LED1~LEDN, wherein N refers to a natural number greater than zero. The 1~N LEDs are corresponding to the 1~N identifiers one by one.

When the user manually rotates the knob 11 for a certain angle, the knob 11 brings the rotary shaft 121 of the rotary encoder 12 to rotate the same angle, so that the channel selection circuit in the rotary encoder 12 converts the angular displacement of the rotary shaft 121 into the corresponding electrical signal. The processing module 6 is linked to the network radio station through the communication module 7 in advance. When the processing module 6 receives the electrical signal, it obtains the audio resource corresponding to the electrical signal from the network radio station, and sends the audio resource to the content presentation unit. The content presentation unit receives and plays the audio resource. In such a way, the desired audio resource can be selected and listened by using the rotary tuning manner of the analog traditional radio.

On the other hand, when the processing module 6 receives the electrical signals, it further drives the LED in the indication module 2 to light up according to the electrical signal. Such that the user can clearly know what kind of audio resource can be listened when the LED corresponding to a certain identifier lights up. Then, the next time when the user wants to listen to the same kind of audio resource, the user only needs to turn the knob 11 to light up the corresponding LED. For example, when the LED corresponding to the identifier "1" lights up, the content presentation unit plays the audio resources of the military theme, then when the user wants to listen to the audio resources of the military theme next time, he/she just need to turn the knob 11 to light up the LED corresponding to the identifier "1".

In conclusion, the implementation of the interactive device for the internet radio station provided by the present application can achieve at least the following beneficial effects.

1. When the interactive device for an internet radio station is used to listen to the network radio station, we can select the desired audio resources by rotating the knob 11. This selection manner is similar to the rotary tuning manner of the traditional radio, so that the user who is used to the traditional radio tuning manner will not have adaption difficulty when using the interactive device for an internet radio station provided by the present application and can accept and freely use the interactive device for an Internet radio station of the present application to select the audio resources.

2. During the listening of the network radio station by the interactive device for an (Internet radio station, when the user have listened to the radio resource from a certain network radio station, the corresponding LED lights up, and each LED has a corresponding identifier for facilitating the user to remember the audio resources corresponding to each LED. In such way, it will be convenient for the user to select the desired audio resource, thus saving the troublesome search.

Furthermore, the interactive device for an internet radio station further comprises a lens 3. The dial 22 is clamped on the shell and the lens 3 is clamped on the side of the dial 22 away from the light board 21. The lens 3 is provided with a third circular hole 32 at its center for passing through the rotary shaft 121 of the rotary encoder 12, and the rotary shaft 121 of the rotary encoder 12 passes through the third circular hole 31. The lens 3 can protect the dial 22 on one hand, and also can facilitate the user to observe the identifier on the dial 22 and the LED on the light board 21 on the other hand.

In additional, the interactive device for an Internet radio station further comprises metal ring 4 buckled on the edge of the lens 3 and surrounding the lens 3, which not only protects the lens 3, but also makes the interactive device for an internet radio station more beautiful.

Embodiment 2

Figure 6:
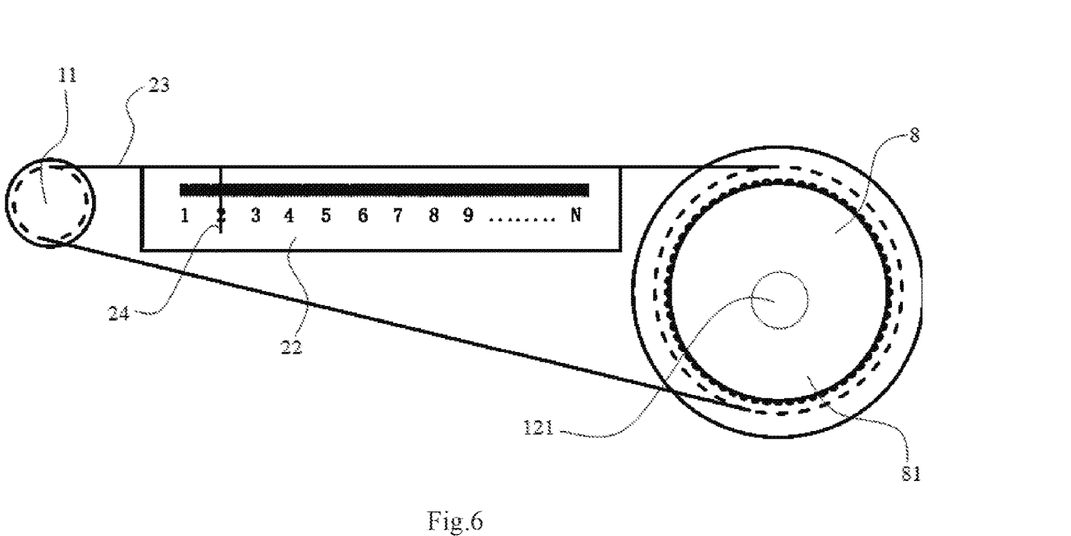
FIG. 6 is a connection diagram between the rotary shaft of the rotary encoder, the knob and the contact module according to the second embodiment of the present application.

The difference between the interactive device for an internet radio station provided by the embodiment and that in the embodiment 1 lies in that the knob 11 is physically connected with the rotary shaft 121 of the rotary encode 12 through the contact module 6. In addition, the structure of the indication module 5 is also different.

Referring to FIG. 6, the indication module 2 comprises a pull wire 23, a pointer 24 connected with the pull wire 23, a dial 22 arranged along the pull wire 23 and a light board 21 corresponding to the dial 22. The dial 22 is provided with N (N refers to a natural number greater than zero) identifiers. The light board 21 provided with an indication circuit electrically connected with the processing module 6. FIG. 5 is a circuit structure diagram of the indication circuit which comprises N LEDs corresponding with the N identifiers one by one. The dial 22 is fixed on the outer side of the shell by screws and is located at the inner side of the pointer 24. In this embodiment, the front side of the shell is provided with a narrow through-hole which is located corresponding to the pull wire 23. The dial 22 is arranged along the upper or lower edge of the through-hole. The N identifiers comprises number "1", "2", "3", "4", "5", "6", "7", "8", "9", . . . and "N". The N identifiers are arranged along the upper or lower edge of the through-hole. The light board 21 is welded on the electronic circuit board 5. The N LEDs are arranged on the surface of the light board 21 facing the dial 22. The N LEDs on the light board 21 are arranged along the through-hole and exposed from the shell through the through-hole for the user's observation. The N LED lights are LED1, LED2, LED3, LED4, LED5, LED6, LED7, LED8, LED9, . . . , LEDN. The N LED lights are aligned with the N identifier one by one.

The contact module 8 comprises a first pull wire wheel 81 sheathed on the rotary shaft 121 of the rotary encode 12. The first pull wire wheel 81 and the knob 11 are winded by the pull wire 23, respectively.

When the knob 11 is rotated by the user for a certain angle, the knob 11 is configured to drive the pull wire 23 to walk a certain track, so that the first pull wire wheel 81 is configured to bring the rotary shaft 121 of the rotary encoder 12 to rotate correspondingly for a certain angle, then the channel selection circuit in the rotary encoder 12 converts the angular displacement of the rotary shaft 211 into the corresponding electrical signal. The processing module 6 is linked to the network radio station through the communication module 7 in advance. When the processing module 6 receives the electrical signal, it obtains the audio resource corresponding to the electrical signal from the network radio station, and sends the audio resource to the content presentation unit. The content presentation unit receives and plays the audio resource. In such a way, the desired audio resource can be selected and listened by using the rotary tuning manner of the analog traditional radio.

On the other hand, when the processing module 6 receives the electrical signals, it further drives the LED in the indication module 2 to light up according to the electrical signal. Meanwhile, the pointer 24 is also configured to move along the dial with the pull wire 23 and align with the identifier corresponding to LED which is switched on. Such that the user can clearly know what kind of audio resource can be listened when the LED corresponding to a certain identifier lights up. Then, the next time when the user wants to listen to the same kind of audio resource, the user only needs to turn the knob 11 to light up the corresponding LED. For example, when the LED corresponding to the identifier "2" lights up, the content presentation unit plays the audio resources of the sociology theme, then when the user wants to listen to the audio resources of the sociology theme next time, he/she just need to turn the knob 11 to light up the LED corresponding to the identifier "2".

Obviously, the interactive device for an interne radio station provided by the implementation of the present embodiment can achieve the same effect as that of the embodiment 1.

Embodiment 3

The difference between the interactive device for an interne radio station provided by the embodiment and that in the embodiment 2 lies in that the contact module 8 is different.

Figure 7:
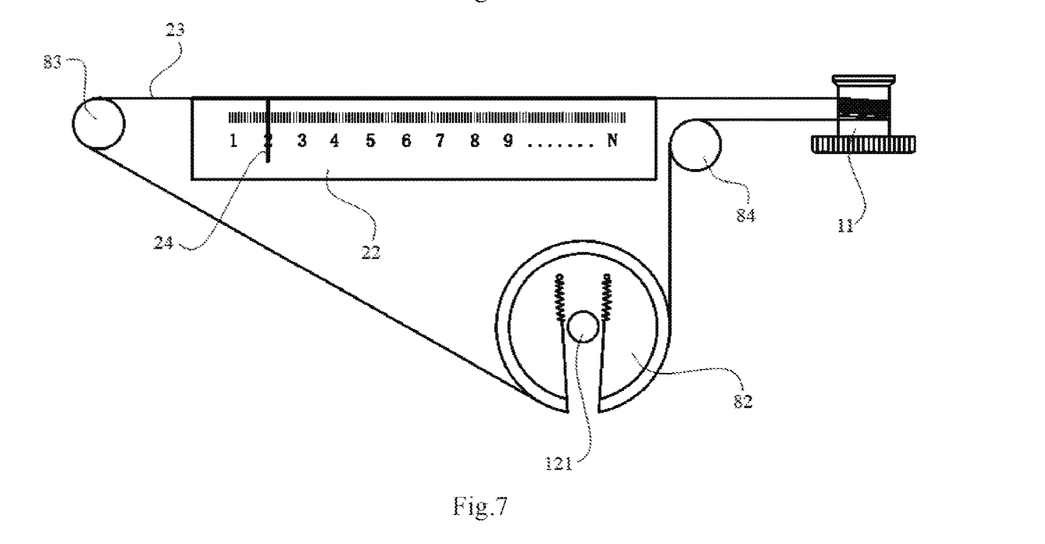
FIG. 7 is a connection diagram between the rotary shaft of the rotary encoder, the knob and the contact module according to the third embodiment of the present application.

As shown in FIG. 7, in the present embodiment, the contact module 8 comprises a second pull wire wheel 82 connecting with the rotary shaft 121 of the rotary encoder 12, a first passive transmission wheel 83 and a second passive transmission wheel 84. The second pull wire wheel 82, the first passive transmission wheel 83, the second passive transmission wheel 84 and the knob 11 are winded by the pull wire 23, simultaneously. The dial 22 is fixed on the outer side of the shell by screws and is located on the inner side of the pointer 24.

Obviously, when the knob 11 is rotated by the user to input the channel selection instruction, the knob 11 will drive the pull wire 23 to walk a certain track. In such a way, the pull wire 23 will rotate the second pull wire wheel 82 for a certain angle. When the second pull wire wheel 82 rotates, the rotary shaft 121 of the rotary encoder 12 is brought by the second pull wire wheel 82 to rotate correspondingly for generating the electrical signal corresponding to the channel selection instruction by the channel selection circuit of the rotary encoder 12. Meanwhile, the pointer 24 moves a certain distance along the dial 22 with the pull wire 23 align with the identifier corresponding to LED which is switched on.

It should be noted that the pull wire 23 can be horizontal or vertical, and correspondingly, the pointer 24 can be vertical or horizontal.

The foregoing is a further detailed description of the present application in connection with specific preferred embodiments, and cannot be considered as that the specific implementation of the present application is limited to these illustrations. It will be apparent to those skilled in the art that any various modifications or substitutions may be made to the present application without departing from the spirit of the invention, and such modifications or substitutions should be considered as falling within the scope of the present application.

The invention claimed is:

1. An interactive device for an internet radio station comprising a content presentation unit and a content selection unit, wherein the content selection unit comprises an operation module, a processing module electrically connected with the operation module, an indication module of a physical shape electrically connected with the processing module, and a communication module electrically connected with the processing module; wherein the operation module is configured to input, by a user, a channel selection instruction by means of manual rotation and generate a corresponding electrical signal; wherein the processing module is linked to a network radio station by the communication module, and configured to obtain, according to the electrical signal, a corresponding audio resource from the network radio station and release the corresponding audio resource to the content presentation unit; the content presentation unit is configured to play the audio resource;

wherein the processing unit is further configured to drive the indication module to generate a state change corresponding to the electrical signal wherein the operation module comprises a rotary encoder and a knob physically connected with a rotary shaft of the rotary encoder through a contact module; wherein the rotary encoder is arranged inside with a channel selection circuit which is configured to generate the electrical signal corresponding to the channel selection instruction; when the knob is rotated by the user to input the channel selection instruction, the knob is configured to bring the rotary shaft of the rotary encoder to rotate through the contact module, such that the rotary encoder is configured to generate the electrical signal corresponding to the channel selection instruction;

wherein the indication module comprises a pull wire, a pointer connected with the pull wire, a dial arranged along the pull wire and a light board corresponding to the dial; wherein the dial is provided with N identifiers which are corresponding with a plurality of different audio resources one by one, the light board is provided with an indication circuit electrically connected with the processing module, wherein the indication circuit comprises N light-emitting elements which are corresponding with the N identifiers one by one, wherein N refers to a natural number greater than zero;

wherein the contact module comprises a first pull wire wheel, wherein the first pull wire wheel and the knob are winded by the pull wire, respectively;

wherein when the knob is rotated by the user to input the channel selection instruction, the knob is configured to drive the pull wire to walk a certain track, so that the first pull wire wheel is configured to bring the rotary shaft of the rotary encoder to rotate correspondingly for generating the electrical signal corresponding to the channel selection instruction; wherein the processing module is configured to obtain, according to the electrical signal, a corresponding audio resource from the network radio station and release the corresponding audio resource to the content presentation unit the content presentation unit is configured to play the audio resource; the processing module is further configured to drive the light-emitting elements to be switched on according to the electrical signal, and the pointer is configured to move along the dial with the pull wire and align with the light-emitting elements which is switched on.

2. An interactive device for an internet radio station comprising a content presentation unit and a content selection unit, wherein the content selection unit comprises an operation module, a processing module electrically connected with the operation module, an indication module of a physical shape electrically connected with the processing module, and a communication module electrically connected with the processing module; wherein the operation module is configured to input, by a user, a channel selection instruction by means of manual rotation and generate a corresponding electrical signal; wherein the processing module is linked to a network radio station by the communication module, and configured to obtain, according to the electrical signal, a corresponding audio resource from the network radio station and release the corresponding audio resource to the content presentation unit; the content presentation unit is configured to play the audio resource; wherein the processing unit is further configured to drive the indication module to generate a state change corresponding to the electrical signal;

wherein the operation module comprises a rotary encoder and a knob physically connected with a rotary shaft of the rotary encoder through a contact module; wherein the rotary encoder is arranged inside with a channel selection circuit which is configured to generate the electrical signal corresponding to the channel selection instruction; when the knob is rotated by the user to input the channel selection instruction, the knob is configured to bring the rotary shaft of the rotary encoder to rotate through the contact module, such that the rotary encoder is configured to generate the electrical signal corresponding to the channel selection instruction;

wherein the indication module comprises a pull wire, a pointer connected with the pull wire, a dial arranged along the pull wire and a light board corresponding to the dial; wherein the dial is provided with N identifiers which are corresponding with a plurality of different audio resources one by one, the light board is provided with an indication circuit electrically connected with the processing module, wherein the indication circuit comprises N light-emitting elements which are corresponding with the N identifiers one by one, wherein N refers to a natural number greater than zero;

wherein the contact module comprises a second pull wire wheel connecting with the rotary shaft of the rotary encoder, a first passive transmission wheel and a second passive transmission wheel; wherein the second pull wire wheel, the first passive transmission wheel, the second passive transmission wheel and the knob are winded by the pull wire simultaneously;

wherein when the knob is rotated by the user to input the channel selection instruction, the knob is configured to drive the pull wire to walk a certain track, so that the second pull wire wheel is configured to bring the rotary shaft of the rotary encoder to rotate correspondingly for generating the electrical signal corresponding to the channel selection instruction; wherein the processing module is configured to obtain, according to the electrical signal, a corresponding audio resource from the network radio station and release the corresponding audio resource to the content presentation unit; the content presentation unit is configured to play the audio resource; the processing module is further configured to drive the light-emitting elements to be switched on according to the electrical signal, and the pointer is configured to move along the dial with the pull wire and align with the light-emitting elements which is switched on.

\* \* \* \* \*